No. 719,080. PATENTED JAN. 27, 1903.
H. W. BRACKEN.
LOOM HARNESS FRAME.
APPLICATION FILED JUNE 25, 1902.
NO MODEL.
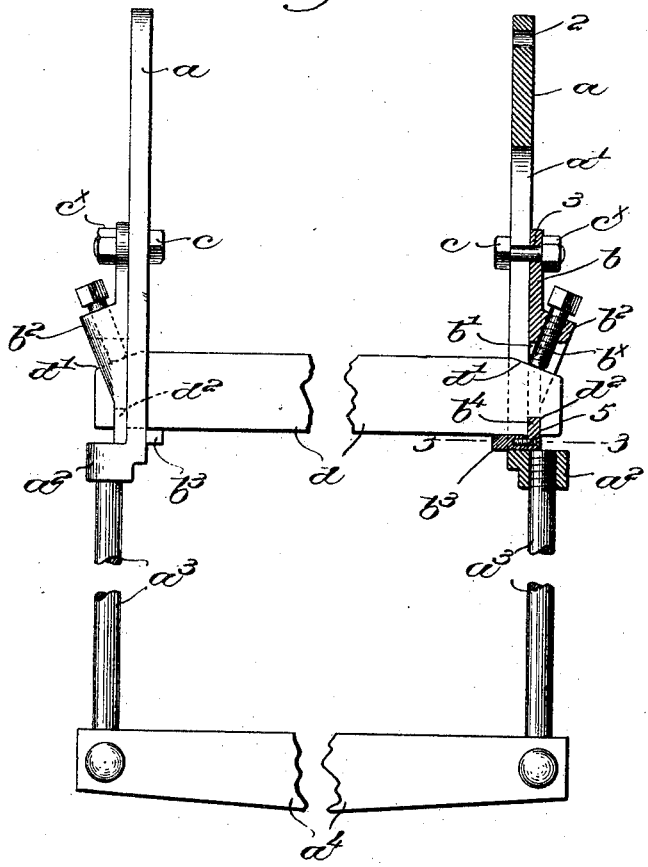
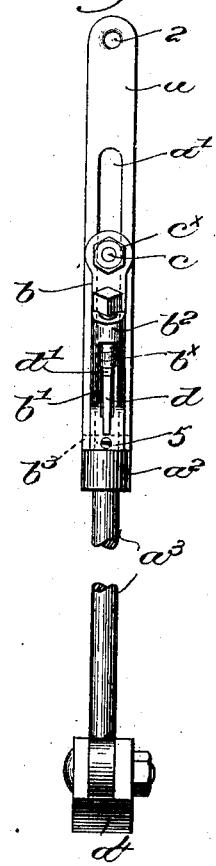
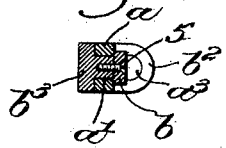
Witnesses,
Edward H. Allen.
Herman J. Sartoris.
Inventor,
Howard W. Bracken
By Crosby Gregory
Atty

UNITED STATES PATENT OFFICE.

HOWARD W. BRACKEN, OF HOPEDALE, MASSACHUSETTS, ASSIGNOR TO DRAPER COMPANY, OF HOPEDALE, MASSACHUSETTS, A CORPORATION OF MAINE.

LOOM HARNESS-FRAME.

SPECIFICATION forming part of Letters Patent No. 719,080, dated January 27, 1903.

Application filed June 25, 1902. Serial No. 113,096. (No model.)

*To all whom it may concern:*

Be it known that I, HOWARD W. BRACKEN, a citizen of the United States, and a resident of Hopedale, county of Worcester, State of Massachusetts, have invented an Improvement in Loom Harness-Frames, of which the following description, in connection with the accompanying drawings, is a specification, like characters on the drawings representing like parts.

This invention relates to harness-frames for looms; and it has for its object the production of means whereby the harness or heddle support may be readily adjusted longitudinally of the harness-frame without necessitating a change or adjustment of the straps or other means whereby the frames are suspended. In order to change the height of the harness, which is frequently necessary in order to attain the proper weaving action, it is now customary to secure the desired adjustment by taking up or letting off the overhead straps, by which the harnesses are suspended. This practice is objectionable on account of the weakening of the straps which results, and it is very inconvenient to effect. The requisite adjustment of the harness is readily effected by my present invention and without any alteration in the suspending-straps.

The novel features of my invention will be hereinafter fully described, and particularly pointed out in the following claims.

Figure 1 is a front elevation, partly broken out and in section, of a harness-frame embodying one form of my invention, the harness or heddles being omitted. Fig. 2 is a side elevation thereof; and Fig. 3 is a transverse sectional detail on the line 3 3, Fig. 1.

I have herein shown the harness-frame as comprising parallel flat side bars $a$, longitudinally slotted at $a'$ for a portion of their length and having at their lower ends threaded hubs $a^2$, into which are screwed the rods $a^3$, the lower ends of the latter being suitably secured to the usual bottom bar $a^4$, to which the treadle (not shown) is connected. The overhead straps or connections (not shown) are attached to the upper end of the side bars, holes 2 therein being provided for the purpose. Slides $b$ are mounted on the outer faces of the side bars and near their lower ends are provided with openings $b'$ opposite or registering with the slots $a'$, and each slide has a lateral extension $b^2$ above its opening, provided with a threaded hole to receive a screw-bolt or similar device $b^\times$ for a purpose to be described. A suitable clamp-bolt $c$ has its shank passed loosely through the slot $a'$ of the side bar and through a hole 3 in the slide, at the upper end thereof, a retaining-nut $c^\times$ on the outer end of the bolt serving to clamp the slide and side bar securely together.

In order to connect the lower end of each slide to the side bar, I have herein shown a foot $b^3$, which is T-shaped in cross-section, Fig. 3, the stem of the foot passing through the slot $a'$ and being secured to the lower end of the slide in any suitable manner, as by a screw 5, or it may form a part of the slide. The head of the said foot engages the inner face of the side bar and serves to guide the slide in its movement.

The harness is sustained by a cross-bar $d$, which is long enough to extend through the side-bar slots $a'$ and the openings $b'$ of the slides, the cross-bar being set on edge, as shown, and beveled along its upper edge at $d'$, adjacent its ends, as best shown in Fig. 1. Notches $d^2$ are made in the lower edge of the supporting-bar to receive the lip-like part $b^4$ of each slide at the bottom of its opening $b'$. This coöperation of the supporting-bar and slides locks the parts together and prevents any relative lateral movement of the side bars of the frame.

Referring to Fig. 1, the screw-bolts $b^\times$ are shown as inclined in the extensions $b^2$ to bear at substantially right angles upon the beveled portions $d'$ of the supporting-bar $d$, and when set up they rigidly yet detachably connect said bar with the two slides.

Steel heddles or warp-stop-motion drop-wires may be strung upon the supporting-bar $d$, or other harness may be supported thereby; but the form of bar herein shown is more particularly adapted for steel heddles—such, for instance, as are shown in United States Patent No. 536,969, dated April 2, 1895.

When it is necessary to adjust the harness vertically, the clamping-bolts c are loosened and the slides moved up or down on the side bars a to the desired height and then set up or clamped. The yarn can in this way be adjusted to any desired place and a number of the frames lined up to give an even shed.

If it is necessary to remove the supporting-bar, it is only necessary to loosen the retaining-screws $b^3$, and the bar d can then be lifted to disengage it from the lips $b^4$ and drawn laterally out of the frame.

My invention is not restricted to the precise construction herein shown and described, as the same may be varied or rearranged in different particulars without departing from the spirit and scope of my invention.

Having fully described my invention, what I claim as new, and desire to secure by Letters Patent, is—

1. In a loom harness-frame, side bars, a cross-bar to support the heddles, and means mounted on the side bars to adjust the cross-bar longitudinally of the side bars.

2. In a loom harness-frame, side bars, a heddle-support, and longitudinally-adjustable means on the side bars to clamp the heddle-support thereto.

3. In a loom harness-frame longitudinally-slotted side bars, a heddle-support having its ends extended through the slots, and means mounted on the side bars to maintain said support in adjusted position on the side bars.

4. In a loom harness-frame, side bars, a heddle-support slidably connected therewith, and means to clamp the support to the side bars.

5. In a loom harness-frame, side bars, slides on and longitudinally movable relatively to the side bars, clamps to hold said slides in adjusted position, a transverse heddle-support, and means to detachably connect it with the slides.

6. In a loom harness-frame, longitudinally-slotted side bars, a heddle-support having its ends extended through the slots, slides longitudinally movable on the side bars, clamping-bolts extended through the slots of the latter to clamp the slides to the side bars, and means on the slides to engage the projecting ends of and detachably connect the heddle-support with the slides.

7. In a loom harness-frame, longitudinally-slotted side bars, a heddle-support having its ends extended through the slots the said support having notches in its lower edge, slides longitudinally movable on the side bars and having openings to receive the projecting ends of the support, a lip on each slide transverse to the support, to enter the notch thereof, means to hold the support on the lips of the slides, and clamping devices to retain the slides in adjusted position on the side bars.

In testimony whereof I have signed my name to this specification in the presence of two subscribing witnesses.

HOWARD W. BRACKEN.

Witnesses:
   GEORGE OTIS DRAPER,
   ERNEST W. WOOD.